June 18, 1935.  J. P. JOHNSON  2,005,227
VARIABLE SPEED TRANSMISSION
Filed Nov. 25, 1932    6 Sheets-Sheet 1
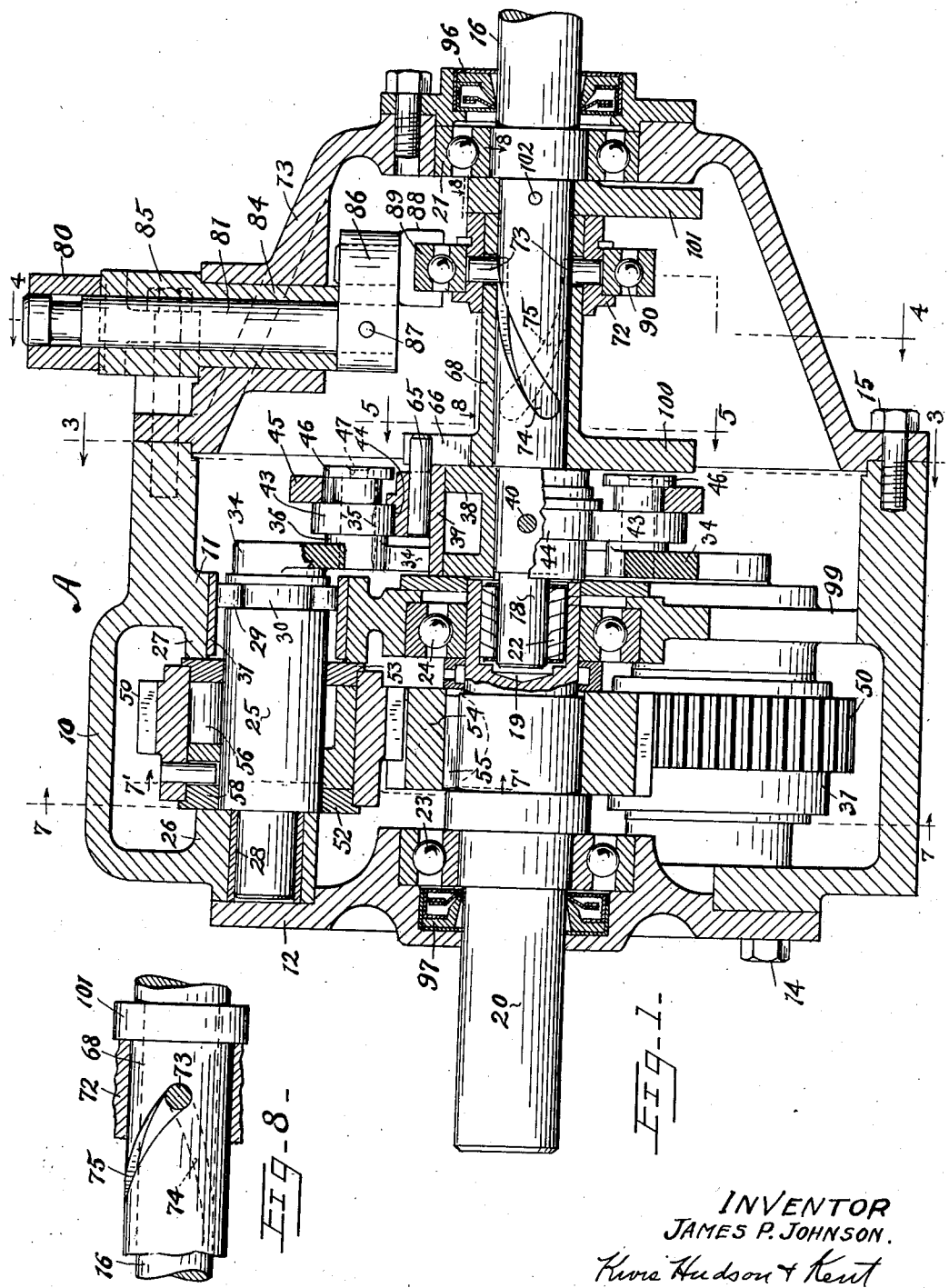
INVENTOR
JAMES P. JOHNSON.
Kwis Hudson + Kent
Attys.

June 18, 1935.　　　J. P. JOHNSON　　　2,005,227
VARIABLE SPEED TRANSMISSION
Filed Nov. 25, 1932　　6 Sheets-Sheet 2
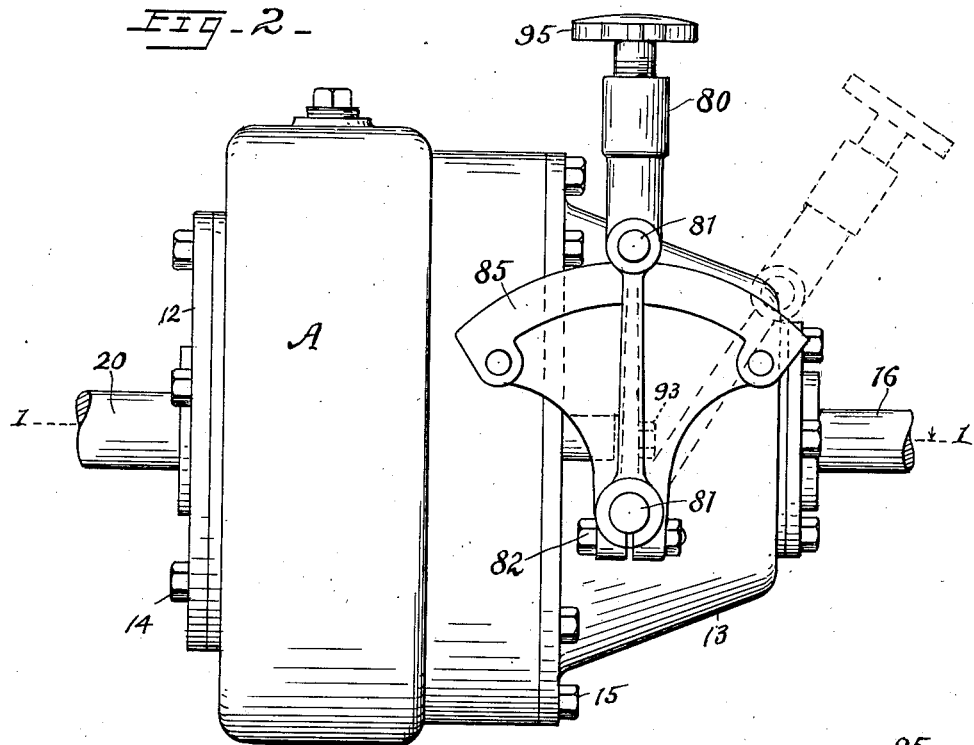
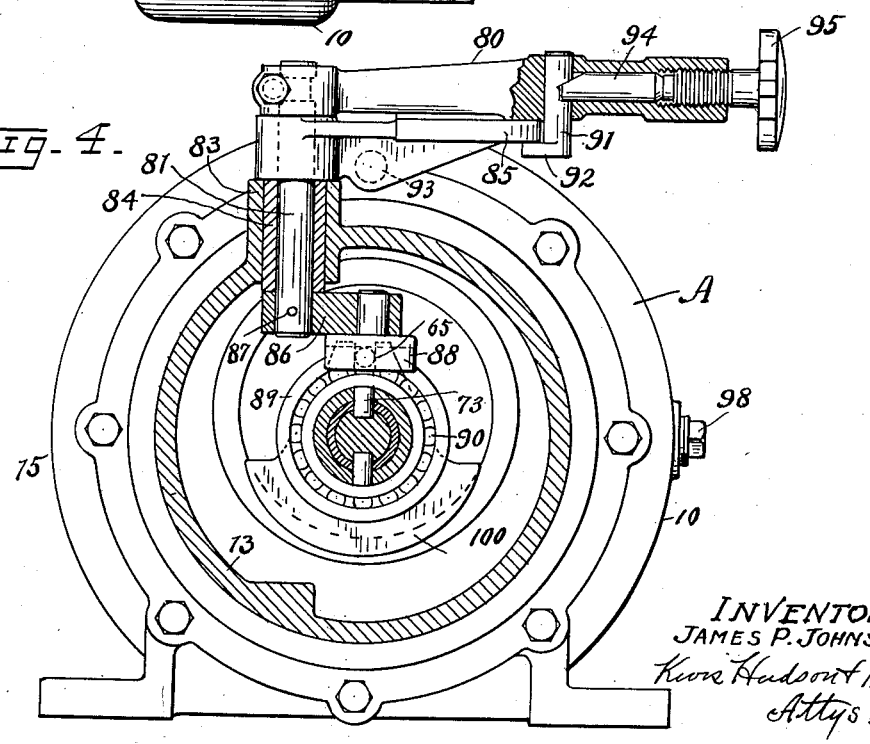
INVENTOR
JAMES P. JOHNSON.
Kwis Hudson & Kent
Attys.

June 18, 1935. J. P. JOHNSON 2,005,227
VARIABLE SPEED TRANSMISSION
Filed Nov. 25, 1932   6 Sheets-Sheet 3
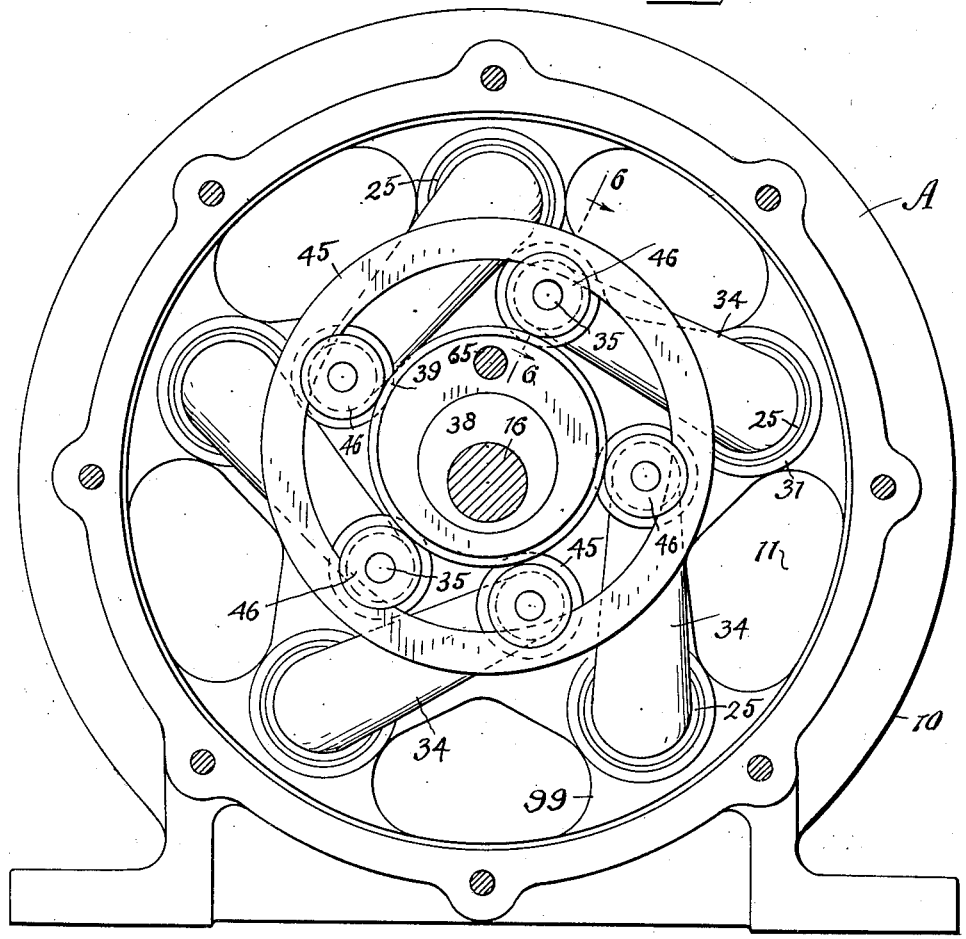
FIG-3-
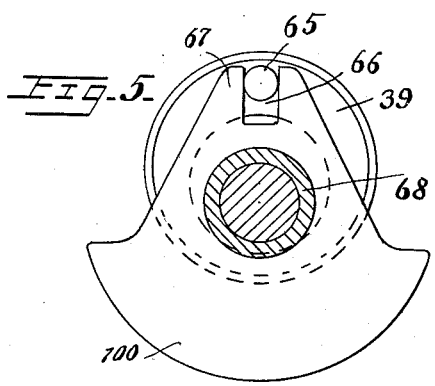
FIG-5-
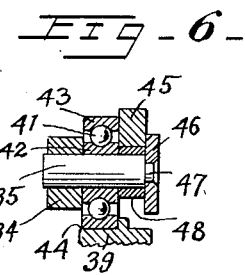
FIG-6-
INVENTOR
JAMES P. JOHNSON.
Kwis Hudson & Kent
Attys.

June 18, 1935.  J. P. JOHNSON  2,005,227
VARIABLE SPEED TRANSMISSION
Filed Nov. 25, 1932    6 Sheets-Sheet 4
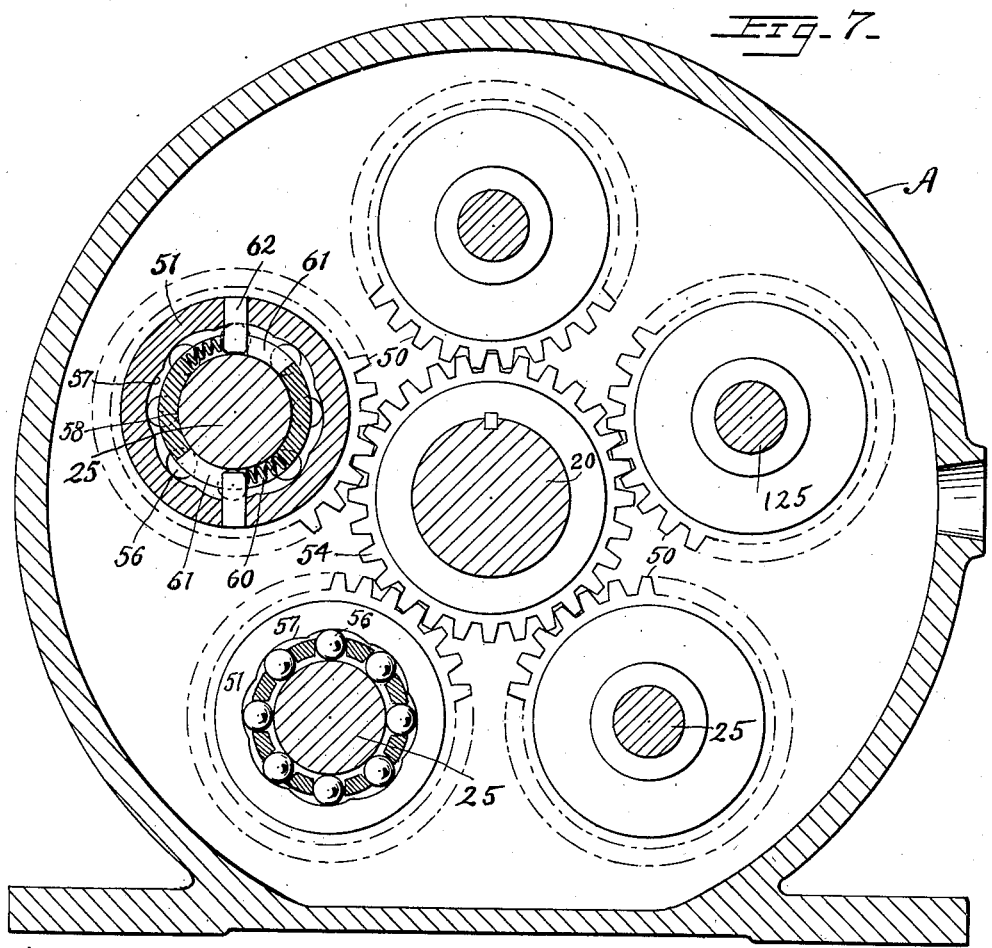
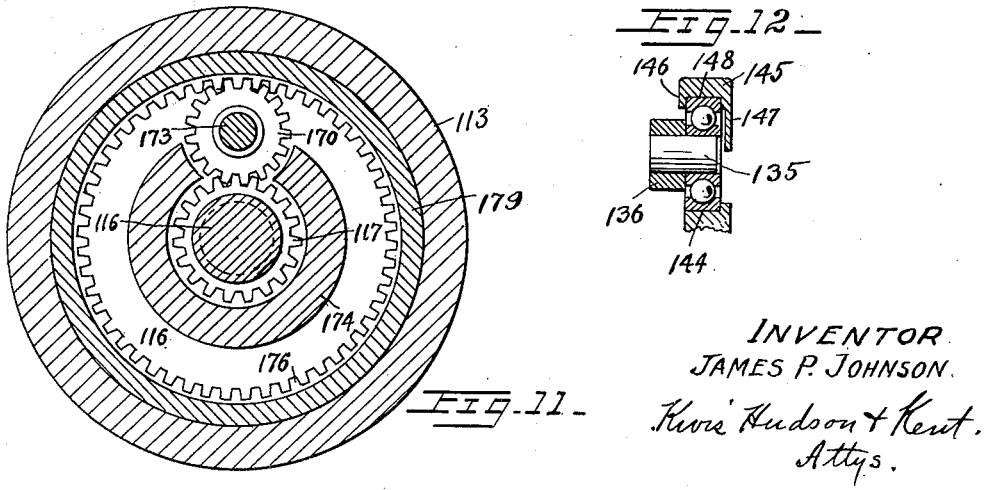
INVENTOR
JAMES P. JOHNSON.

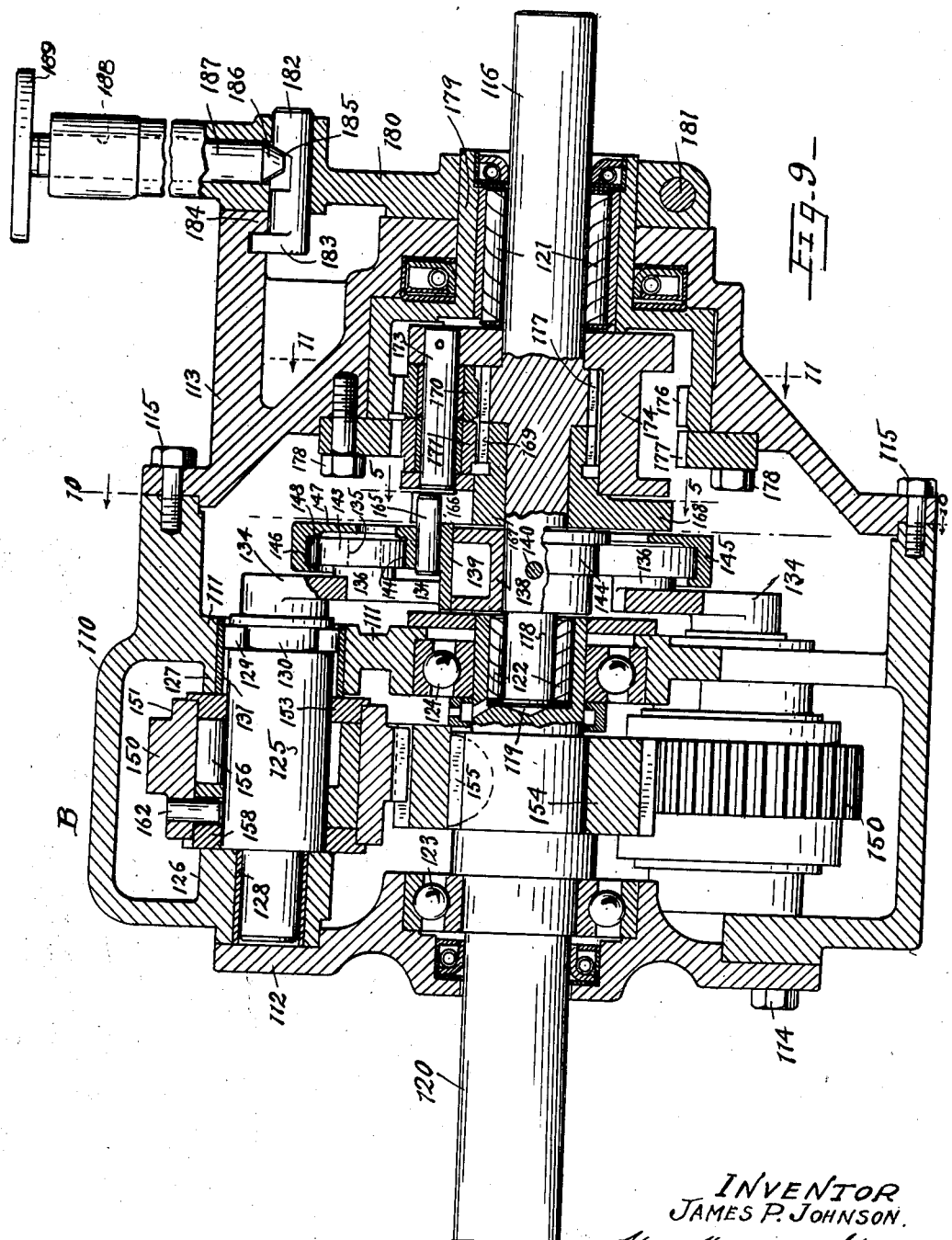

June 18, 1935.　　　J. P. JOHNSON　　　2,005,227
VARIABLE SPEED TRANSMISSION
Filed Nov. 25, 1932　　6 Sheets-Sheet 6
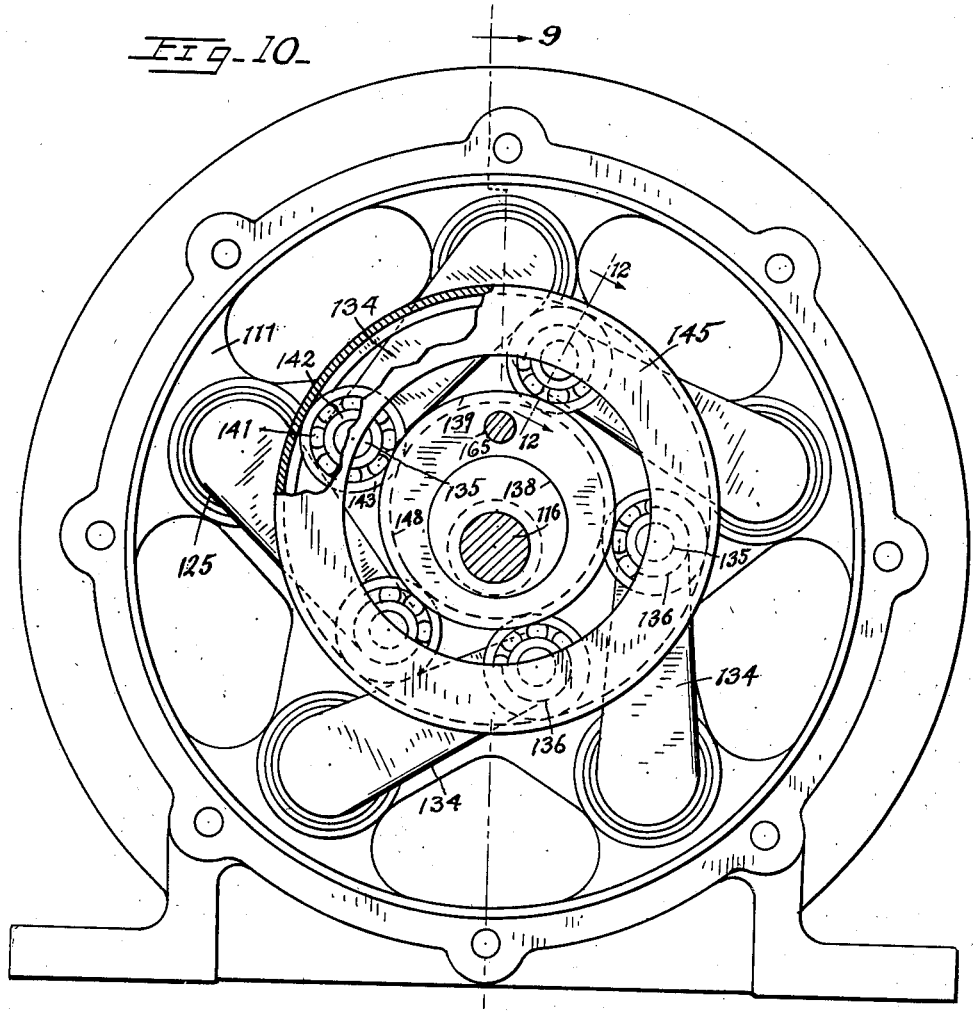
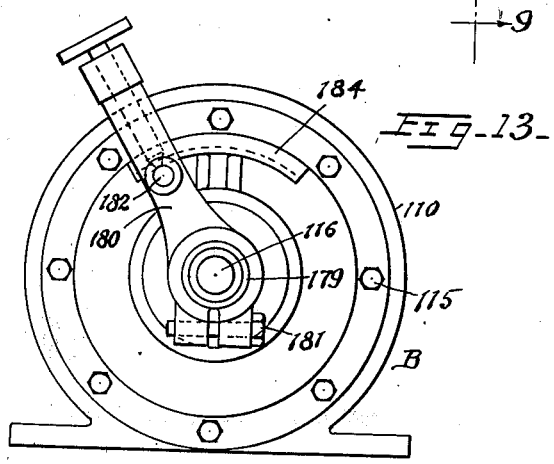
INVENTOR
JAMES P. JOHNSON.

Patented June 18, 1935

2,005,227

UNITED STATES PATENT OFFICE 2,005,227

VARIABLE SPEED TRANSMISSION

James P. Johnson, Shaker Heights, Ohio

Application November 25, 1932, Serial No. 644,170

4 Claims. (Cl. 74—117)

The present invention relates to a power transmission mechanism, and more particularly to a mechanical transmission of the variable speed type.

The object of the present invention is the provision of a novel variable speed power transmission in which the speed may be changed in an infinite number of steps without interrupting the transmission of power.

Another object of the invention is the provision of a novel means for changing the amount of eccentricity of a variable eccentric member supported on a rotating shaft during the rotation of the shaft.

Further objects and advantages of the invention will be apparent to those skilled in the art from the following description of the preferred embodiment thereof, described with reference to the accompanying drawings, in which Fig. 1 is a section, with portions in elevation, approximately on the line 1—1 of Fig. 2, of a power transmission embodying the preferred construction of the invention;

Fig. 2 is a plan view of the transmission shown in Fig. 1;

Fig. 3 is a section on the line 3—3 of Fig. 1;

Fig. 4 is a section, with portions in elevation, approximately on the line 4—4 of Fig. 1;

Fig. 5 is a section on the line 5—5 of Fig. 1;

Fig. 6 is a section on the line 6—6 of Fig. 3;

Fig. 7 is a section approximately on the line 7—7 of Fig. 1, with the upper left gear shown in section on the line 7'—7' and the lower left gear in section on the line 7''—7'';

Fig. 8 is a section on the line 8—8 of Fig. 1;

Fig. 9 is a section, with portions in elevation, approximately on the line 9—9 of Fig. 10, showing a modification of the power transmission illustrated in Figs. 1 to 8, inclusive;

Fig. 10 is a section on the line 10—10 of Fig. 9;

Fig. 11 is a section on the line 11—11 of Fig. 9;

Fig. 12 is a section on the line 12—12 of Fig. 10; and

Fig. 13 is an end elevation of the device shown in Fig. 9, looking towards the left.

Similar reference characters designate corresponding parts throughout the several figures of the drawings.

Referring to the preferred embodiment of the invention illustrated in Figs. 1 to 8, inclusive, the reference character A designates a housing, comprising a central portion 10 provided with a partition 11 and two end covers 12 and 13 bolted thereto by the bolts 14 and 15. A drive shaft 16 having a reduced end portion 18 formed integral therewith, is rotatably supported in the end cover 13 and a recess 19 in a driven shaft 20, by anti-friction bearings 21 and 22, respectively. The driven shaft 20 is rotatably supported in the end cover 12 and partition 11 by anti-friction bearings 23 and 24, respectively, and is adapted to be driven from the drive shaft 16 by mechanism hereinafter referred to.

A plurality of crankshafts 25 equally spaced about the axis of the driven shaft 20 are rotatably supported in bosses 26 and 27 formed in the central member 10 and the partition 11 of the housing A, by bushings 28, and anti-friction rollers 29, respectively. The anti-friction rollers 29 run in grooves 30 formed in the crankshafts 25 and engage steel races 31 secured in the bosses 27. Crank arms 34 formed integral with the crankshafts 25 carry cranks or crank pins 35 fixed in bosses 36 in any suitable manner. The crankshafts 25 are oscillated upon rotation of the drive shaft 16 by a variable eccentric comprising two coaxial eccentric members 38 and 39, the inner eccentric member 38 of which is fixed to the shaft 16 by a pin 40, and the outer eccentric member 39 is rotatably supported on the inner eccentric member 38. The eccentricity of each of the eccentric members 38 and 39 is equal, and the arrangement is such that the resultant amount of eccentricity may be varied from zero to maximum eccentricity by producing a relative rotation between the outer eccentric member 39 and the inner eccentric member 38.

The cranks or crank pins 35 carry anti-friction bearings 41, the inner races 42 of which are fixed to the cranks or crank pins 35 and the outer races 43 engage a finished surface 44 on the outer eccentric member 39. The outer races 43 are held in contact with the eccentric member in such a manner that they roll on the finished surface 44 as the eccentric revolves, by an annular member 45 carried on the outer ends of the cranks or crank pins 35 and held in position thereon by a member 46 riveted to the ends of the cranks or crank pins as at 47. A tubular bushing 48, preferably of bronze or some such bearing material, is positioned on the cranks or crank pins 35 underneath the annular member 45. From the foregoing description it will be apparent that upon rotation of the drive shaft 16 the outer races 43 of the anti-friction bearings 41 will follow the eccentric members 38 and 39 producing an oscillation of the crank arms 34 and, in turn, an oscillation of the crankshafts 25.

Gears 50 provided with hubs 51, rotatably supported by means of bushing members 52 and 53 on each of the crankshafts 25, are continuously in mesh with a central gear 54 keyed to the driven shaft 20, by a key 55. The gears 50 are operatively connected to or driven from the respective crankshafts 25 upon which they are mounted by one-way driving clutches in the form of rollers 56 positioned between cam surfaces 57 formed on the interior surface of the gears 50, and the crankshafts 25. Roller cages 58 rotatably supported about the crankshafts 25 and movable relative to the gears 50 are continuously urged in a counterclockwise direction, as viewed in Fig. 3, to operatively engage the rollers 56 with the cam surfaces 57 by springs 60 positioned in cutaway portions 61 of the cages 58 and compressed between parts thereof and pins 62 fixed in the hubs 51 of the gears 50. In construction, the cam surfaces 57 are arc-shaped and converge toward the center of the crankshafts 25 in both directions which enables the direction in which the one-way driving clutch will transmit motion to be reversed by merely changing the spring 60 to the other side of the pins 62.

From the above description it will be apparent that the oscillations of the crankshafts 25 will be transmitted to the driven shaft 20 in the form of intermittent uni-directional rotational movements through the rollers 56, the gears 50 and the gear 54. In the construction illustrated, five duplicate power transmissions or connections are employed between the driving and the driven shafts, but the number may be varied as required within the scope of this invention. The employment of a plurality of transmissions or connections, as shown, enables the shaft 20 to be driven at a continuous, uniform speed even at very low speeds, since the crankshafts are all directly oscillated from the same eccentrics and are equally spaced thereabout. In operation, the load is carried by successive power transmissions or connections and is shifted evenly and without interruption from one to the other.

The amount of oscillation imparted to the crankshafts 25 may be varied by producing a relative rotation of the outer eccentric member 39 with reference to the inner eccentric member 38 which, in turn, changes the resultant or effective eccentricity of the eccentric members. The following mechanism is provided for rotating the outer eccentric member 39 relative to the inner eccentric member 38 without interrupting the transmission of power or stopping the rotation of any of the parts. A pin 65 fixed in the outer eccentric member 39 engages in a slot 66 formed in a flange 67 on a sleeve 68 rotatably supported on the drive shaft 16. A collar member 72 slidably supported on the sleeve 68 carries two pins 73 which engage in spiral slots 74 and 75 in the shaft 16 and the sleeve 68, respectively. The spiral angles of the slots 74 and 75 are in opposite directions and movement of the collar member 72 longitudinally of the sleeve 68, by virtue of the pins 73 and the slots 74 and 75, causes a relative rotation of the shaft 16 and the sleeve 68, the amount of which, for a given movement of the collar member 72, will depend upon the spiral angle of the slots. In the embodiment illustrated, the slots 74 and 75 have equal spiral angles, but it will be understood that the spiral angle of either may be varied as desired even to the extent of having one of the sets of slots straight.

The collar member 72 is reciprocated longitudinally of the sleeve 68 by a hand grasp lever 80 fixed to a short shaft 81 by a bolt 82. The shaft 81 is rotatably supported in a boss 83 formed in the end cover 12, by a bushing 84 formed integral with a sector member 85, and carries on the lower end thereof an arm 86 secured thereto by a pin 87. The arm 86 carries a yoke member 88 which engages over the outer race 89 of an anti-friction bearing 90 secured to the collar member 72. The hand grasp lever 80 is held in any adjusted position by a lock bolt 91 slidably supported therein and provided with a projection 92 adapted to engage the sector member 85 which is secured to the housing A by the bushing 84 and a bolt 93. The lock bolt 91 is moved to engage the sector member 85 by a cam bolt 94 slidably supported in a longitudinal aperture in the hand grasp lever 80 and moved therein by a thumb-screw 95 in a manner well known in the art. The sector member 85 may be graduated in terms of speed reduction etc., if desired. The reference characters 96 and 97 indicate oil retainers and the reference character 98 indicates an oil plug in the housing A. Openings 99 are provided in the partition 11 to permit the free circulation of oil within the housing.

The eccentric masses connected to the drive shaft are counterbalanced by a counterbalance 100 formed integral with the flange 67 and a counterbalance 101 fixed to the drive shaft 16 by a tapered pin 102. The counterbalances not only counterbalance the eccentric members 38 and 39, but also the parts operatively connected thereto, and the effectiveness of the counterbalances varies in proportion to the masses to be counterbalanced, since they are fixed on the relatively movable parts 16 and 68 and are rotated relative to each other as the effective or resultant eccentricity of the eccentric members 38 and 39 is varied. The entire transmission is effectively counterbalanced at all speeds.

From the foregoing description, it is believed that the operation of the transmission will be apparent but it may be summarized as follows: In operation the shaft 16, eccentric members 38 and 39, pin 65, flange 67, sleeve 68, collar member 72, and counterweights 100 and 101 rotate as a unit. The cranks or crank pins 35 follow the eccentric members as the same rotate, the outer races 43 of the anti-friction bearings 41 being held in contact with the finished surface 44 on the outer eccentric member 39 by the annular member 45. The oscillations of the crankshafts 25 are transmitted to the gears 50 and, in turn, the central gear 54, by the one-way driving clutches 56, the direction of operation of which may be reversed by changing the springs 60 to the opposite sides of the pins 62. Since the oscillations of the crankshafts 25 are received directly from the same eccentric, it will be apparent that the amount of oscillation of each crankshaft will be equal at all times, which is of considerable importance, especially at very low speeds of the driven shaft 20, where a slight variation in the extent of oscillation between the various crankshafts would result in a variable speed of the driven shaft or produce an oscillation in the driven shaft.

Figs. 9 to 13, inclusive, show a modification of the preferred embodiment of the invention illustrated in Figs. 1 to 8, inclusive, and described above. The transmission illustrated in these figures is substantially a duplicate of that illustrated in Figs. 1 to 8 with the exception of the means for holding the crank mechanism against the outer eccentric and the mechanism for producing the rotation of the eccentrics relative to each other.

Referring to Figs. 9 to 13, inclusive, the reference character B designates a housing comprising a central portion 110 provided with a partition 111 and two end covers 112 and 113 secured thereto by the bolts 114 and 115. A drive shaft 116 having a gear 117 and a reduced end portion 118 formed integral therewith, is rotatably supported in the end cover 113 and a recess 119 in a driven shaft 120 by anti-friction bearings 121 and 122, respectively. The driven shaft 120 is rotatably supported in the cover plate 112 and partition 111 by anti-friction bearings 123 and 124, respectively, and is adapted to be driven from the driving shaft 116 by mechanism, hereinafter referred to.

A plurality of crankshafts 125, equally spaced about the axis of the driven shaft 120, are rotatably supported in bosses 126 and 127 formed in the central member 110 and partition 111 by bushings 128 and anti-friction rollers 129, respectively. The anti-friction rollers 129 run in grooves 130 formed in the crankshafts 125, and engage steel races 131 secured in the bosses 127. Crank arms 134, formed integral with the crankshafts 125, carry cranks or crank pins 135 fixed in bosses 136 in any suitable manner. The crankshafts 125 are oscillated upon rotation of the drive shaft 116 by a variable eccentric, comprising two coaxial eccentric members 138 and 139, the inner eccentric member 138 of which is fixed to the drive shaft 116 by a pin 140, and the outer eccentric member 139 is rotatably supported on the inner eccentric member 138. The eccentricity of each of the eccentric members 138 and 139 is equal, the construction being such that the resultant amount of eccentricity may be varied from zero to maximum eccentricity by producing a relative rotation between the outer eccentric member 139 and the inner eccentric member 138.

Each of the cranks or crank pins 135 carry anti-friction bearings 141, the inner races 142 of which are affixed to the cranks or crank pins 135 and the outer races 143 engage a finished surface 144 on the outer eccentric member 139. The outer races 143 are held in contact with the finished surface 144 on the outer eccentric member, as the same revolves, by mechanism hereinafter described.

From the foregoing description it will be apparent that upon rotation of the drive shaft 116, the crankshafts 125 will be oscillated through the eccentric members 138 and 139, the outer races 143, the cranks or crank pins 135, and the crank arms 134. The oscillations of the crankshafts 125 are transmitted to the drive shaft 120 through gears 150 provided with hubs 151 and rotatably supported by means of bushing members 152 and 153 on the crankshafts 125. The gears 150 are continuously in mesh with a central gear 154 keyed to the driven shaft 120 by a key 155 and are operatively connected to, or driven from the respective crankshafts upon which they are mounted, by one-way driving clutches in the form of rollers 156, positioned between the gears 150 and the crankshafts 125, and cooperating with arc-shaped cam surfaces formed on the interior surface of the gears.

Roller cages 158 rotatably supported about the crankshafts 125 and movable relative to the gears 150, are continuously urged in one direction to operatively engage the rollers 156 with one side of the cam surfaces by springs positioned in cut-away portions of the cages 158, and compressed between parts thereof and pins 162 fixed in the hubs 151 of the gears 150. The cam surfaces are arc-shaped and converge toward the center of the crankshafts 125 in both directions, a construction which enables the direction in which the one-way driving clutch will transmit motion, to be reversed, by changing the springs to the opposite side of the pins 162 whereby the roller cages 158 are moved in the opposite direction to force the rollers into engagement with the opposite side of the cam surfaces.

The oscillations of the crankshafts 125 will be transmitted to the driven shaft 120 in the form of intermittent unidirectional movements through the rollers 156, the gears 150 and the gear 154. In the illustration five duplicate power transmissions or connections are shown between the driving and the driven shafts, but the number may be varied within the scope of this invention. As stated above, the employment of a plurality of transmissions or connections enables the drive shaft 120 to be rotated at a continuous uniform speed. By oscillating the crankshafts 125 direct from the same eccentric the speed of the driven shaft can be maintained uniform, even at very low speeds of the shaft, because there is no variation in the amount of oscillation imparted to the various crankshafts.

The mechanism so far described is substantially a duplicate of that shown in the preferred embodiment of the invention illustrated in Figs. 1 to 8, inclusive, the variation between the two modifications being for the most part limited to the means for holding the outer races 43 and 143 in engagement with the finished surface 44 and 144 on the outer eccentric members 39 and 139, respectively, and to the mechanism for rotating the outer eccentric members 39 and 139 relative to the inner eccentric members 38 and 138.

The outer races 143 are held in contact with the finished surface 144 on the outer eccentric member 139 by means of an annular member 145, provided with flanges 146 and 147 projecting toward the center thereof, and which surrounds all the races. The surface 148 on the annular member 145 which engages the races 143 is finished so that in operation the races may roll thereon. As stated above, the amount of oscillation imparted to the crankshafts 125 may be varied by producing a relative rotation between the outer eccentric member 139 and the inner eccentric member 138, which, in turn, changes the resultant or effective eccentricity of the eccentric members, and the following mechanism is provided for rotating the outer eccentric member relative to the inner eccentric member.

A pin 165 fixed in the outer eccentric member 139 engages in a slot 166 formed in a collar member 167 rotatably supported on the drive shaft 116 and provided with a counterweight 168 and a gear 169 formed integral therewith. The gear 169 is of the same diameter as the gear 117, previously mentioned, and which is formed integral with the drive shaft 116. The gears 117 and 169 are continuously in mesh with gears 170 and 171, respectively, rotatably supported on a short shaft 173 fixed in a spool-shaped member 174.

The gears 170 and 171 are of the same size and are continuously in mesh with large internal gears 176 and 177, respectively. Gear 177 is secured to the end cover 113 by bolts 178 and the gear 176, which is of the same size and has the same number of teeth as gear 171, is formed on a cup-shaped member 179 rotatably supported in the end cover 113 and adapted to be rotated relative thereto by a hand grasp lever 180 secured to one end thereof, as by the clamp bolt 181. The hand grasp lever 180 is locked in any desired position by a lock bolt 182 having a head 183 which engages a flange 184 formed integral with the end cover 113. The lock bolt 182 is drawn to the right, as viewed in Fig. 9, to lock the parts in position by means of cooperating cam surfaces 185 and 186 formed on the lock bolt 182 and a cam bolt 187, respectively. The cam bolt 187 is slidably carried in an aperture 188 formed in the hand grasp lever 180 and is moved therein to engage the cam surface 186 with the cam surface 185 by a thumb-screw 189 threaded into the upper end of the aperture 188.

As illustrated, only one counterbalance is shown, but a second counterbalance may be employed, if desired, in a manner similar to that illustrated in the preferred embodiment. In operation, the eccentric members 138 and 139, and the collar member 167, rotate as a unit with the drive shaft 116 and the gears 170 and 171, and the spool-shaped member 174 rotate as a unit at a slower speed than that of the drive shaft. Upon movement of the cup-shaped member 179 by means of the hand grasp 180, a relative rotation will be produced between the gears 176 and 177, the gears 170 and 171, and the collar member 167, the gears 117 and 169 and the drive shaft 116 which will rotate the outer eccentric member 139 with reference to the inner eccentric member 138 by virtue of the slot 166 and pin 165.

From the foregoing disclosures it will be apparent that a new and improved variable speed transmission has been produced in which the speed of the drive shaft may be increased from rest to full speed without interrupting the transmission of power and in which there will be no appreciable oscillation of the drive shaft even at slow speeds. While the length of the crank arms is determined within certain limits by the relative size of other portions of the transmission, in the preferred construction the distance between the axes of the crank shafts and the axes of the crank pins is approximately two thirds or three quarters of the distance between the axis of the drive shaft and the axis of the crank shaft, and the drive shaft is preferably rotated in a counter-clockwise direction, as viewed in Fig. 3. This construction and operation will give a more uniform and satisfactory angular velocity to the crank shafts during the effective part of their driving movement.

The invention has been illustrated and described with reference to the preferred embodiments thereof, but I do not wish to be limited to the particular construction illustrated and described which may be varied within the scope of the invention, and I particularly point out and claim as my invention the following:

1. A power transmission comprising a drive shaft, a driven shaft, a plurality of crank shafts spaced about the axis of one of said shafts, an eccentric carried by said drive shaft, crank arms on said crank shafts, crank pins on said crank arms, rollers rotatably mounted antifrictionally on said crank pins and adapted for rolling engagement with said eccentric, a ring engageable with said crank pins for maintaining said rollers in engagement with said eccentric, and one-way driving clutches between said crank shafts and said driven shaft.

2. A power transmission comprising a drive shaft, a driven shaft, a plurality of crank shafts spaced about the axis of one of said shafts, one way clutches between said crank shafts and said driven shaft, an eccentric secured to said drive shaft, a second eccentric mounted on said first mentioned eccentric and adapted for oscillatory movement relative thereto, crank arms on said crank shafts, crank pins on said crank arms, rollers antifrictionally mounted on said crank pins and adapted for rolling engagement with said second eccentric, a ring engageable with said crank pins for maintaining said rollers in engagement with said second eccentric, a sleeve movably mounted on said drive shaft and having a lateral extension to provide a counterweight, said sleeve having a slot, a pin carried by said second eccentric and having an end disposed in said slot, a member secured to said drive shaft and having a lateral extension to provide a second counterweight complementary to said first mentioned counterweight, and means for moving said sleeve to vary the relative eccentricity of said eccentrics.

3. A power transmission comprising a drive shaft, a driven shaft, a plurality of crank shafts spaced about the axis of one of said shafts, one way clutches between said crank shafts and said driven shaft, an eccentric secured to said drive shaft, a second eccentric mounted on said first mentioned eccentric and adapted for oscillatory movement relative thereto, crank arms on said crank shafts, crank pins on said crank arms, rollers antifrictionally mounted on said crank pins and adapted for rolling engagement with said second eccentric, a ring engageable with said crank pins for maintaining said rollers in engagement with said second eccentric, a sleeve movably mounted on said drive shaft and having a lateral extension to provide a counterweight on one side and having a slot opposite thereto, a pin carried by said second eccentric and having an end disposed in said slot, a member secured to said drive shaft and having a lateral extension to provide a second counterweight complementary to said first mentioned counterweight, and means for moving said sleeve to vary the relative eccentricity of said eccentrics.

4. A power transmission comprising a housing separable intermediate its ends, a driven shaft having its inner end rotatably mounted in one portion of said housing, a drive shaft rotatably mounted in the other portion of said housing and having its inner end antifrictionally supported by said driven shaft, an external gear secured to said driven shaft, a plurality of crank shafts spaced about the axis of said driven shaft and rotatably supported in the driven end portion of said housing, external gears mounted on said crank shafts and in constant mesh with said external gear on said driven shaft, cam means disposed between said external gears and their respective crank shafts for permitting relative movement therebetween in one direction only, an eccentric secured to the inner end of said drive shaft, a second eccentric mounted on said first mentioned eccentric and adapted for oscillatory movement relative thereto, crank arms on the inner ends of said crank shafts, crank pins on said crank arms, rollers antifrictionally mounted on said crank pins and adapted for rolling engagement with said second eccentric, a ring engageable with said crank pins for maintaining said rollers in engagement with said second eccentric, a sleeve movably mounted on said drive shaft and having a lateral extension at its inner end to provide a counterweight, said sleeve having a slot, a pin having one end secured to said second eccentric and its opposite end disposed in said slot, a member secured to said drive shaft adjacent the outer end of said sleeve and having a lateral extension to provide a counterweight complementary to said first mentioned counterweight, and manually operated means supported by the drive end portion of said housing and operably connected to said sleeve for moving the latter to vary the relative eccentricity of said eccentrics.

JAMES P. JOHNSON.